United States Patent [19]

Evans

[11] 4,247,118
[45] Jan. 27, 1981

[54] RECORD PLAYERS

[75] Inventor: Philip H. Evans, Stourbridge, England

[73] Assignee: BSR Limited, Warley, England

[21] Appl. No.: 20,705

[22] Filed: Mar. 15, 1979

[30] Foreign Application Priority Data

Sep. 2, 1978 [GB] United Kingdom ............... 5184/78

[51] Int. Cl.³ .......................................... G11B 17/02
[52] U.S. Cl. ................... 369/233; 369/134; 369/212
[58] Field of Search .............. 179/100.4 A; 274/1 R, 274/15 R, 13 B, 10 R

[56] References Cited

U.S. PATENT DOCUMENTS 3,280,272 10/1966 Simpson .......................... 274/1 R
3,826,504 7/1974 Evans et al. ..................... 279/15 R Primary Examiner—Harry N. Haroian
Attorney, Agent, or Firm—Hopgood & Calimafde

[57] ABSTRACT

A muting switch for co-operation with the phono sockets of a record player to short circuit the leads from the pick-up, which are connected to the phono socket, at all times except when a record is being played.

3 Claims, 2 Drawing Figures

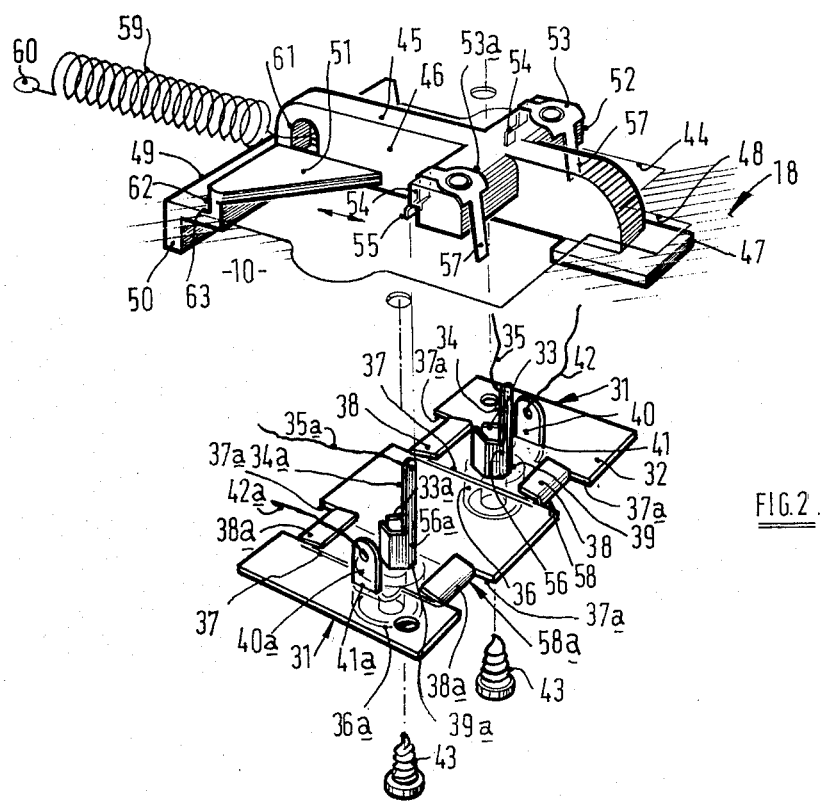

RECORD PLAYERS

BACKGROUND OF THE INVENTION

This invention relates to a record player of the type, hereinafter referred to as the type described, comprising a deck plate, a turntable rotatably mounted on the deck plate and driven, in use, by an electric motor, a centre spindle extending upwardly from the centre of the turntable, a tone arm carrying a pick-up at one end and mounted for pivotal movement about vertical and horizontal axes and drive means to pivot the tone arm about the horizontal axis to disengage the pick-up from a record and then to swing the tone arm about the vertical axis to position the tone arm outwardly of the periphery of the record.

Record players of the type described are commonly provided with a pair of phono sockets adapted to receive plug members to connect the pick-up of the record player to sound reproducing equipment such as amplifier and speaker. A phono socket comprises an inner tubular socket part adapted to receive the male part of a plug and an outer socket part adapted to be received within the female part of the plug, the inner and outer socket parts being co-axial and insulated from each other and provided with means for connection thereto of conductors.

Generally two phono sockets are provided in a unit and mounted in a common base plate of insulating material. There are also known some phono socket units having two sockets in which there is a single outer socket part which is common to both the sockets and such phono sockets are included within the scope of the invention. The invention is also applicable to a single phono socket.

It is desirable in a record player of the type described to provide a muting switch operative to short-circuit the leads from the pick-up to the sound reproducing equipment at all times except when a record is being played and a manually operable member of the record player is in a "play" position.

It is an object of the invention to provide a new or improved muting switch which can act on the phono socket assembly of a record player of the type described to short-circuit the leads from the pick-up to the sound reproducing equipment.

SUMMARY OF THE INVENTION

According to the present invention we provide in or for a record player of the type described a muting switch having a switch member which is movable relative to the phono socket assembly and which carries resilient contact members adapted to be moved into contact with the inner and outer socket parts to short circuit the leads from the pick-up.

The switch member may move slidably in a direction transverse to the axial direction of the socket parts.

The resilient contacts provided on the switch member are arranged so as to be movable relative to the switch member in the direction of movement of the switch member when contact is made with the socket parts to accommodate variation in the relative position of the socket parts and the engaged position of the switch member.

The contacts may provide a pair of inherently resilient limbs depending from the switch member.

BRIEF DESCRIPTION OF THE DRAWINGS

The invention will now be described in more detail by way of example with reference to the accompanying drawings wherein:

FIG. 2 is an exploded perspective view to an enlarged scale of a muting switch and phono socket assembly of the record player of FIG. 1.

DESCRIPTION OF THE PREFERRED EMBODIMENT

Figure 1:
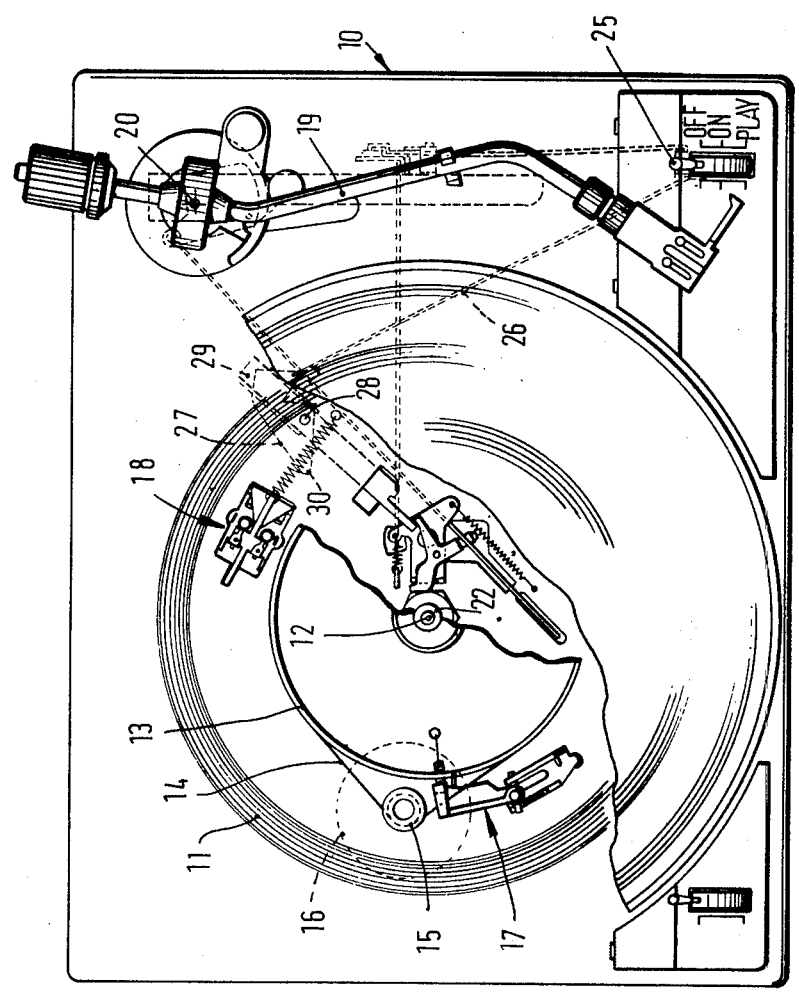
FIG. 1 is a plan view, with parts omitted, of a record player embodying the invention.

Referring to the drawings a record player comprises a deck plate 10 having a turntable 11 rotatably mounted thereon having a centre spindle 12 at its centre. The turntable 11 has a driving boss 13 on its under-surface engaged by a belt 14 driven by a pulley 15 on the shaft of an electric motor 16.

A change speed mechanism indicated generally at 17 is provided as described in more detail in our co-pending application No. 20706. In addition a muting switch 18 is provided as described in more detail hereinafter. In addition, a drive means is provided for moving a tone arm 19 out of playing engagement with a record on the turntable 11 as described in more detail in our co-pending application No. 20704.

The tone arm 19 is carried at the upper end of a vertical spindle 20 for movement about a horizontal axis whilst the vertical spindle 20 is itself mounted in a bearing means for movement about a vertical axis.

A hub 22 is fixed at the centre of the turntable and has a radially outwardly projecting dog, not shown, which as hereinafter described is adapted to initiate operation of a switch-off mechanism at the appropriate time as described in our Specification number 4,133,539 filed on the 13th Oct. 1977.

The muting switch 18 is adapted to short circuit the leads to the pick-up at all times except when a manually engageable lever 25 is in the "play" position. This is achieved by the provision of a link 26 extending from the lever 25 to a plate 27 pivoted about an axis 28 to a trip-lock lever 29.

The plate 27 has a nose part 30 and is adapted to be pivoted by the link 26 to move the nose 30 into a position to operate means to open the circuit to the pick-up when the lever 25 is moved to the "play" position and is likewise caused to be moved to the position shown in FIG. 1 by the automatic switch-off mechanism at the end of playing of a record to short circuit the leads from the pick-up.

Referring now particularly to FIG. 2, the phono socket assembly comprises a pair of conventional phono sockets 31. Both sockets 31 are identical except that the tag 40 extends from opposite sides of the respective base plates. The right hand of the two sockets will now be described. The same reference numerals have been used to refer to the corresponding parts of the two sockets but with the suffix 'a' applied to the left-hand socket in FIG. 2. The socket 31 is mounted on an insulating base plate 32 and comprises an inner socket part 33 having an axially projecting finger 34 to which a conductor 35 is soldered and which extends to a terminal of the pick-up of the record player. Co-axially surrounding the socket 33 is a cylindrical member 36 which comprises an outer socket and which is pressed from a plate 37 the ends of which are bent over a cut-out part 37a of the base plate 32 as indicated at 38 and serves to mount the socket on the base plate. A suitable insulating material is interposed between the outer socket part 36 and the inner socket part 33 to insulate the parts and to mount them co-axially together. The base plate 32 is provided with an aperture 39 through which the end of the inner socket part 33 extends. The plate 37 of the outer socket part is provided with a laterally extending tag which has an axially extending part 40 which extends through an aperture 41 formed in the base plate 32 and which is soldered to a conductor 42.

Similarly a conductor 35a extends to a third terminal of the pick-up and the conductor 42a is connected to the part 40a.

The base plate 32 is connected by self-tapping screws 43 to the deck plate 10 beneath an aperture 44 formed therein. The construction of the phono socket assembly so far described is of generally known form and is such as to be found in a record player of the type described.

Reference is now made to the muting switch shown in the upper part of FIG. 2. A switch member 45 made of synthetic plastics material is slidably mounted within the aperture 44 and comprises a main body part 46 having at one end a projecting plate-like part 47 which is received under the deck plate 10 in the region of a slot 48 which extends from the aperture 44.

At its other end the body part 46 carries a transversely extending part 49 which extends beneath the deck plate 10 and has a down-turned part 50 for engagement by the plate 27. A web part 51 extends between the body part 46 and the part 49 for strength.

Intermediate its ends the body part 46 carries a cross part 52 to which generally U-shape contacts 53 and 53a are riveted. Each contact 53, 53a includes a downwardly extending part 54 with a stepped outer end 55 for engagement with the inner socket parts 33, 33a respectively in the region indicated at 56, 56a. The contacts also include a downwardly extending part 57, which extend downwardly and slightly in the direction towards the end plate 47 and which are adapted to engage the bent-over parts 38, 38a in the regions indicated at 58, 58a.

A coil tension spring 59 extends between an aperture 60 formed in the deck plate 10 and an aperture 61 formed in the body part 46 and which serves normally to urge the switch member 45 in the direction away from the end of the aperture 44 with the slot 48 and hence in the direction to engage the contact parts 55 and 57 with their associated contact regions 56, 56a and 58, 58a respectively.

The contact members 53 are made of a suitable material such as copper and are of such dimensions that the parts 54 and 57 are inherently resilient and so can be moved against their inherent spring bias in the path of movement of the switch member 45 to ensure good contact. In addition, the clearance between the body member and the aperture 44 is such as to permit of slight movement of the switch member relative to the deck plate in the direction transverse to its direction of operative movement.

In use, the contacts 55 and 57 are maintained in contact with the parts 56, 56a and 58, 58a by the coil tension spring 59 to keep the leads to the pick-up short-circuited, and the inherent resilience of the contact parts permit them to maintain good contact with the regions 56, 56a and 58, 58a independent of any variation between the position of these parts and the engaged position of the body member of the muting switch which is defined as a result of engagement between the downwardly depending part 62 thereof and the end wall 63 of the aperture 44.

At the appropriate time, to remove the short-circuit, the plate 27 moves as described hereinbefore to engage the part 49 to move the switch member 45 against the bias of the spring 59 to disengage the contacts 55 and 57 from the regions 56, 56a and 58, 58a.

The construction described hereinbefore provides an efficient and economical manner of providing a muting switch in a record player having a conventional phono socket assembly. The inherent resilience of the contacts 54 and 57 and the ability of the switch member 45 to move laterally to a limited extent relative to the deck-plate ensures good contact being made irrespective of the variation in the position of the phono contacts relative to the end wall 63 of the aperture in the deck-plate as a result of manufacturing tolerances.

I claim:

1. An improved muting switch for a record player of the type in which a phono socket assembly is mounted to a fixed part of the record player and the phono socket assembly includes at least one phono socket for electrical connection between the record player's transducer and an amplifier, the phono socket having inner and outer electrically separate parts, the improvement comprising:

a switch body of insulated material disposed for sliding movement between first and second positions on said fixed part of said record player, said sliding movement being at generally right angles to the axis of said socket assembly;

a generally U-shaped metal contact member, said contact member being secured to said switch body at the base of the U, the two arms of said contact member projecting outwardly from said switch body and being resiliently flexible in the direction of movement of said switch body, said arms being constructed and arranged so as to make electrical contact with said inner and outer parts of said socket assembly when said switch body is in said first position and to be out of electrical contact when said switch body is in said second position;

a switch operating member moveably mounted on said record player adjacent said switch body for engagement therewith; and means for moving said switch operating member to cause it to engage with and move said switch body.

2. The muting switch as claimed in claim 1 further including a second phono socket in said socket assembly, said switch body being generally cruciform in configuration with the larger part thereof extending in the direction of movement of said switch body, each arm of said cruciform switch body having one of said U-shaped contact members disposed thereon and means for biasing said contact members into engagement with said phono sockets.

3. The muting switch assembly as claimed in claim 2 further including a slot in said fixed part of said record player, the portion of said switch body forward of said arms of said cruciform switch body being slidably disposed in said slot, a transverse member disposed on said switch body at a portion rearward of said arms, said transverse member having a portion thereof slidably disposed in said slot, said switch operating member engaging said transverse member.

* * * * *

UNITED STATES PATENT AND TRADEMARK OFFICE
CERTIFICATE OF CORRECTION

PATENT NO. : 4,247,118
DATED : January 27, 1981
INVENTOR(S) : Philip H. Evans

It is certified that error appears in the above-identified patent and that said Letters Patent are hereby corrected as shown below:

On Page 1, Section [30], please delete the Foreign Application Priority Data.

Signed and Sealed this

Fourteenth Day of July 1981

[SEAL]

Attest:

Attesting Officer

GERALD J. MOSSINGHOFF

Commissioner of Patents and Trademarks